United States Patent
Mianzo et al.

(10) Patent No.: US 11,821,177 B2
(45) Date of Patent: *Nov. 21, 2023

(54) GROUND ENGAGING TOOL WEAR AND LOSS DETECTION SYSTEM AND METHOD

(71) Applicant: Caterpillar Inc., Peoria, IL (US)

(72) Inventors: Lawrence A Mianzo, Pittsburgh, PA (US); Tod A Oblak, Pittsburgh, PA (US); John M Plouzek, Peoria, IL (US); Shawn Nainan Mathew, Savoy, IL (US); Raymond Alan Wise, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 170 days.

This patent is subject to a terminal disclaimer.

(21) Appl. No.: 17/171,569

(22) Filed: Feb. 9, 2021

(65) Prior Publication Data
US 2022/0251807 A1 Aug. 11, 2022

(51) Int. Cl.
*E02F 9/00* (2006.01)
*E02F 9/26* (2006.01)
(Continued)

(52) U.S. Cl.
CPC ............ *E02F 9/267* (2013.01); *E02F 9/2808* (2013.01); *G06V 10/25* (2022.01); *G06V 10/443* (2022.01); *G06V 10/70* (2022.01); *G06V 2201/07* (2022.01)

(58) Field of Classification Search
CPC ...... E02F 9/267; E02F 9/2808; G06V 10/443; G06V 10/70; G06V 2201/07
See application file for complete search history.

(56) References Cited

U.S. PATENT DOCUMENTS

| 8,411,930 B2 | 4/2013 | Ridley et al. |
| 9,670,649 B2 | 6/2017 | Bewley et al. |

(Continued)

FOREIGN PATENT DOCUMENTS

| CN | 106592679 A | 4/2017 |
| CN | 107862675 A | 3/2018 |

(Continued)

OTHER PUBLICATIONS

Detecting the presence of stationary objects from sparse stereo disparity space, 2010 Fourth Pacific-Rim Symposium on Image and Video Technology, Nov. 14-17, 2010 (Year: 2010).*

(Continued)

*Primary Examiner* — Vivek D Koppikar
*Assistant Examiner* — Joan T Goodbody

(57) ABSTRACT

An example wear detection system receives a left image and a right image of a bucket of a work machine having at least one ground engaging tool (GET). The example system identifies a first region of interest from the left image corresponding to the GET and a second region of interest from the right image corresponding to the GET. The example system also generates a left-edge digital image corresponding to the first region of interest and a right-edge digital image corresponding to the second region of interest. Further, the example system determines a sparse stereo disparity between the left-edge digital image and the right-edge digital image, and also determines a wear level or loss for the at least one GET based on the sparse stereo disparity.

13 Claims, 11 Drawing Sheets

(51) Int. Cl.
  *E02F 9/28* (2006.01)
  *G06V 10/44* (2022.01)
  *G06V 10/70* (2022.01)
  *G06V 10/25* (2022.01)

(56) References Cited

U.S. PATENT DOCUMENTS

| | | |
|---|---|---|
| 9,886,754 B2 | 2/2018 | Lim et al. |
| 10,249,060 B2 | 4/2019 | Wagner et al. |
| 10,339,667 B2 | 7/2019 | Tafazoli Bilandi et al. |
| 10,504,072 B2 | 12/2019 | Restum et al. |
| 10,929,820 B2 | 2/2021 | Restum et al. |
| 2015/0085123 A1* | 3/2015 | Tafazoli Bilandi ..... G01S 17/06 348/148 |
| 2016/0237640 A1 | 8/2016 | Carpenter et al. |
| 2017/0051474 A1 | 2/2017 | Finch et al. |
| 2017/0103506 A1 | 4/2017 | Dandibhotla et al. |
| 2017/0352199 A1 | 12/2017 | Finley et al. |
| 2018/0106019 A1 | 4/2018 | Bewley et al. |
| 2020/0362539 A1 | 11/2020 | Plouzek et al. |
| 2020/0363203 A1 | 11/2020 | Plouzek et al. |
| 2020/0393303 A1 | 12/2020 | Betournay et al. |
| 2021/0042907 A1 | 2/2021 | Campomanes et al. |

FOREIGN PATENT DOCUMENTS

| | | |
|---|---|---|
| WO | WO2019/227194 A1 | 12/2019 |
| WO | WO2019/277194 A1 | 12/2019 |
| WO | WO20200237324 A1 | 12/2020 |
| WO | WO20210041988 A1 | 3/2021 |

OTHER PUBLICATIONS

Tiandi Duan et al: "Detecting the presence of stationary objects from sparse stereo disparity space", 2010 Fourth Pacific-Rim Symposium on Image and Video Technology (PSIVT 2010); Singapore, Nov. 14-17, 2010, IEEE, Piscataway, NJ, USA, Nov. 14, 2010 (Nov. 14, 2010), pp. 15-20, XP031839210,, ISBN 978-1-4244-8890-2 abstract p. 16, Section B / p. 17, Section D.2 / p. 17-18, section III.

* cited by examiner

GROUND ENGAGING TOOL WEAR AND LOSS DETECTION SYSTEM AND METHOD

TECHNICAL FIELD

The present disclosure relates to a system and method for detecting wear of objects over time, and more particularly, to a system and method for detecting wear in, or loss of, ground engaging tools (GET) over time using computer vision techniques.

BACKGROUND

Machines may be used to perform variety of tasks at a worksite. For example, machines may be used to excavate, move, shape, contour, and/or remove material present at the worksite, such as gravel, concrete, asphalt, soil, and/or other materials. These machines can include a bucket used to collect such materials, and the bucket can include a set of ground engaging tools (GET), such as teeth, to loosen the material. GET can also include shrouds attached to the bucket between teeth to protect the edge of the bucket. Over time, the GET wear and diminish in size reducing their effectiveness making it more difficult for the bucket to collect worksite material. GET can also break from the bucket. When a GET break goes undetected, the GET can mix with the worksite material and can cause damage to downstream processing equipment such as crushers or pulverizers. Work machines may utilize wear detection systems to identify worn or broken GET before damage to downstream equipment occurs.

An attempt to provide a wear detection system is described in WIPO PCT Publication WO 2019/227194 A1 ("the '194 Publication"), published Dec. 5, 2019. Specifically, the '194 Publication describes a method and system for monitoring conditions of an operating implement of heavy equipment, such as tooth of a work machine bucket. The method and system receive an image of the operating implement and process it using a first neural network trained to identify regions of interest within the image. Each region of interest has an associated designation as a critical region or a non-critical region. An embedded processor proximate to the heavy equipment further processes critical regions using a second neural network to identify "wear landmarks" on the operating implement. The system and method then compare the wear landmarks with a reference image to determine wear of the operating implement.

The '194 Publication reliance on neural networks and machine learning for identifying wear levels can be problematic because it can be difficult to measure GET wear at a scale that allows for rapid detection of wear conditions and accurate scheduling of preventative maintenance. For example, exclusive use of neural networks and machine learning may only provide for measurement accuracy within a few centimeters, but precision at ranges less than 5 millimeters may be desirable. In addition, machine learning techniques such as those described in the '194 Publication can be prone to a large amount of "false positives" concerning GET wear or loss rendering them ineffective. The systems and methods described herein are directed to addressing one or more of these concerns.

SUMMARY

According to a first aspect, a method for detecting wear or loss of ground engaging tools (GET) includes receiving, from a stereoscopic camera associated with a work machine, a left image and a right image of a bucket of the work machine. The bucket has at least one GET. The method further includes identifying a first region of interest from the left image corresponding to the at least one GET and identifying a second region of interest from the right image corresponding to the at least one GET. The method also includes generating a left-edge digital image corresponding to the first region of interest and generating a right-edge digital image corresponding to the second region of interest. The method also includes determining a sparse stereo disparity between the left-edge digital image and the right-edge digital image. Based on the sparse stereo disparity, the method determines a wear level or loss of the at least one GET.

According to a further aspect, a GET wear detection system includes a stereoscopic camera, one or more processors, and non-transitory computer readable media storing executable instructions. The executable instructions when executed by the processor cause the processor to perform operations including receiving from the stereoscopic camera a left image and a right image of a bucket of a work machine. The bucket has at least one GET. The operations also include identifying a first region of interest from the left image corresponding to the at least one GET and identifying a second region of interest from the right image corresponding to the at least one GET. The operations also include generating a left-edge digital image corresponding to the first region of interest and generating a right-edge digital image corresponding to the second region of interest. The operations further include determining a sparse stereo disparity between the left-edge digital image and the right-edge digital image. Based on the sparse stereo disparity, the processor determines a wear level or loss of the at least one GET.

According to another aspect, a work machine includes a having a left monochrome image sensor, a right monochrome image sensor, and a color image sensor. The work machine also includes a bucket having at least one ground engaging tool (GET), one or more processors; and a non-transitory computer readable media storing executable instructions that when executed by the one or more processors cause the one or more processors to perform operations. The operations can include receiving a left image of the bucket captured by the left monochrome image sensor, a right image of the bucket captured by the left monochrome image sensor, and a color image of the bucket captured by the color image sensor from the stereoscopic camera. The operations also include identifying a first region of interest from the left image and a second region of interest from the right image by applying a deep learning GET detection algorithm to the left image and the right image and generating a dense stereo disparity map for the left image and the right image. The operations also include generating a left-edge digital image corresponding to the left region of interest and a right-edge digital image corresponding to the right region of interest by using gradient magnitude edge detection techniques. The operations also include determining a sparse stereo disparity between the left-edge digital image and the right-edge digital image and determining a wear level or loss for the at least one GET based on the sparse stereo disparity.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

The present disclosure is generally directed to systems and methods for detecting wear of components of a work machine in an environment, such as a worksite, using computer vision techniques. In some examples, a stereoscopic camera (or "stereo camera") associated with a work machine captures video of a component of the work machine. The video is analyzed by a wear detection computer system associated with the work machine—which may be disposed within the stereo camera or external from the stereo camera—to detect wear of the component. The component can be one or more ground engaging tools (GET) of a bucket of the work machine, as one example. The stereo camera captures a left image and a right image including the GET, and the wear detection computer system processes the images using stereo computer vision techniques to identify a region of interest in both the left image and the right image corresponding to the GET. In addition, or in the alternative, a deep learning GET detection algorithm trained to identify the region of interest in both the left and right images can be employed. Once the wear detection computer system identifies the regions of interest for both the left image and right image, it further processes the regions of interest to generate edges associated with the GET. The wear detection computer system determines a sparse stereo disparity using the left-edge digital image and the right-edge digital image to determine GET wear or loss based on the number of pixels enclosed within the sparse stereo disparity, by comparing the sparse stereo disparity to previously determined sparse stereo disparities of the same GET, or by comparing the sparse stereo disparity to a reference image. By using a sparse stereo disparity between the left-edge digital image and the right-edge digital image, the systems and methods disclosed herein can accurately measure wear or loss of GET at levels of accuracy less than 5 mm.

Figure 1:
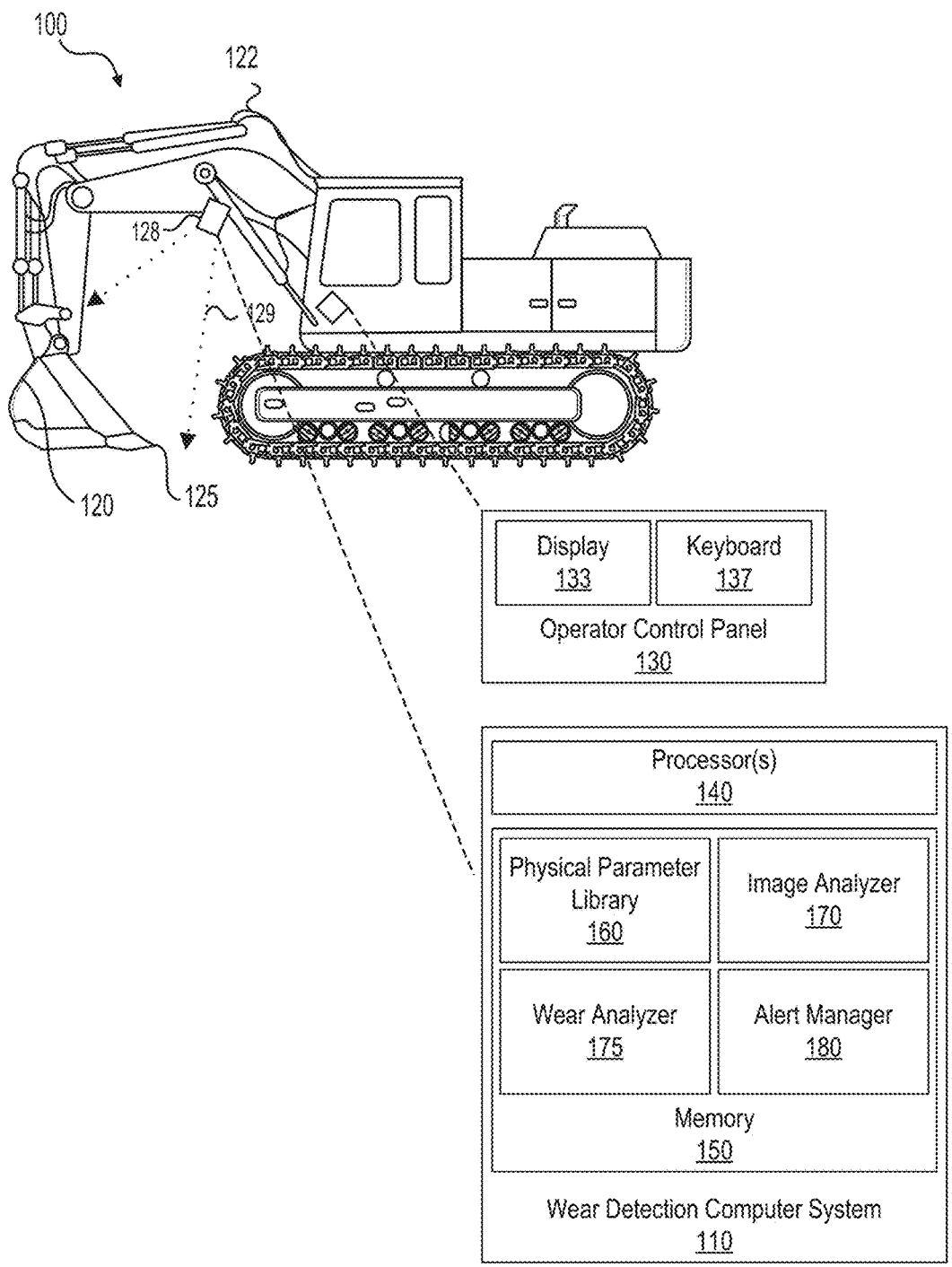
FIG. 1 is a block diagram depicting a schematic view of an example machine including an example system for detecting wear in GET.

FIG. 1 is a block diagram depicting a schematic of an example work machine 100 including an example wear detection computer system 110. While FIG. 1 depicts work machine 100 as a hydraulic mining shovel, in other examples, work machine 100 can include any machine that moves, sculpts, digs, or removes material such as soil, rock, or minerals. As shown in FIG. 1, work machine 100 can include a bucket 120 attached to arm 122. Bucket 120 can include one or more ground engaging tools (GET) 125, such as teeth, that assist work machine 100 in loosening material. While the examples provided in this disclosure typically refer to GET 125 as teeth, other types of GET are contemplated to be within the scope of the embodiments provided by this disclosure. For example, GET can include lip shrouds, edge guards, adapters, ripper protectors, cutting edges, sidebar protectors, tips, or any other tool associated with a work machine that wear over time due to friction with worksite material.

Work machine 100 can also include a stereo camera 128. Camera 128 has a field-of-view 129 directed to bucket 120 and GET 125. Stereo camera 128 includes a left image sensor and a right image sensor that are spaced apart as to capture a stereo image of objects within field-of-view 129, such as bucket 120 and GET 125. In some embodiments, the left image sensor and the right image sensor capture monochromatic images. Stereo camera 128 can also include a color image sensor to capture color images of objects within field-of-view 129. In some embodiments, camera 128 outputs digital images or work machine 100 may include an analog to digital converter disposed between camera 128 and wear detection computer system 110 to covert analog images to digital images before they are received by wear detection computer system 110.

As work machine 100 operates within a worksite, it may move arm 122 to position bucket 120 to move or dig material within the worksite as part of a dig-dump cycle. As work machine 100 positions bucket 120 through the dig-dump cycle, bucket 120 may move in and out of field-of-view 129 of camera 128. Camera 128 may be positioned so that it has an unobstructed view of GET 125 during the dig-dump cycle. For example, camera 128 may be positioned on work machine 100 so that bucket 120 and GET 125 are visible at the moment bucket 120 empties material within the dig-dump cycle. As another example, camera 128 may be positioned so that bucket 120 enters its field-of-view when arm 122 is fully extended or fully contracted within the dig-dump cycle. As explained below with respect to FIGS. 2-4, the position of camera 128 may vary depending on the type of work machine 100 and specifics related to its worksite.

According to some embodiments, work machine 100 can include an operator control panel 130. Operator control panel 130 can include a display 133 which produces output for an operator of work machine 100 so that the operator can receive status or alarms related to wear detection computer system 110. Display 133 can include a liquid crystal display (LCD), a light emitting diode display (LED), cathode ray tube (CRT) display, or other type of display known in the art. In some examples, display 133 can include audio output such as speakers or ports for headphones or peripheral speakers. Display 133 can also include audio input devices such as microphone or ports for peripheral microphones. Display 133 can include a touch-sensitive display screen in some embodiments, which can also act as an input device.

In some embodiments, operator control panel 130 can also include a keyboard 137. Keyboard 137 can provide input capability to wear detection computer system 110. Keyboard 137 can include a plurality of keys allowing the operator of work machine 100 to provide input to wear detection computer system 110. For example, an operator may depress the keys of keyboard 137 to select or enter the type of work machine 100, bucket 120, and/or GET 125 according to examples of the present disclosure. Keyboard 127 can be non-virtual (e.g., containing physically depressible keys) or keyboard 127 can be a virtual keyboard shown on a touch-sensitive embodiment of display 133.

As shown in FIG. 1, wear detection computer system 110 can include a one or more processors 140. Processor(s) 140 can include one or more of a central processing unit (CPU), a graphics processing unit (GPU), a field-programmable gate array (FPGA), some combination of CPU, GPU, or FPGA, or any other type of processing unit. Processor(s) 140 may have numerous arithmetic logic units (ALUs) that perform arithmetic and logical operations, as well as one or more control units (CUs) that extract instructions and stored content from processor cache memory, and then executes the instructions by calling on the ALUs, as necessary, during program execution. Processor(s) 140 may also be responsible for executing drivers and other computer-executable instructions for applications, routines, or processes stored in memory 150, which can be associated with common types of volatile (RAM) and/or nonvolatile (ROM) memory.

In some embodiments, wear detection computer system 110 can include a memory 150. Memory 150 can include system memory, which may be volatile (such as RAM), nonvolatile (such as ROM, flash memory, etc.) or some combination of the two. Memory 150 can further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by wear detection computer system 110.

Memory 150 can store data, including computer-executable instructions, for wear detection computer system 110 as described herein. For example, memory 150 can store one or more components of wear detection computer system 110 such as a physical parameter library 160, an image analyzer 170, a wear analyzer 175, and an alert manager 180. Memory 150 can also store additional components, modules, or other code executable by processor(s) 140 to enable operation of wear detection computer system 110. For example, memory 150 can include code related to input/output functions, software drivers, operating systems, or other components.

According to some embodiments, aspects of wear detection computer system 110 may be disposed within camera 128. For example, camera 128 may include one or more of processor(s) 140 and/or memory 150. In addition, or alternatively, aspects of wear detection computer system 110 may be disposed on work machine 100 and outside of camera 128. For example, both work machine 100 and camera 128 may include one or more processor(s) 140 or memory 150, or one or more processor(s) 140 or memory 150 may be disposed entirely outside of camera 128, but within work machine 100.

Physical parameter library 160 can include physical parameter sets related to work machine 100, bucket 120 and/or GET 125. For example, physical parameter library 160 can include measurement data related to the size of bucket 120, shape of bucket 120, size of GET 125, shape of GET 125, and the spatial relationship between GET 125 and bucket 120, as just some examples. Physical parameter library 160 can also include parameters related to the size and shape of GET 125 in a new or unworn state and parameters related to the size and shape of GET 125 when they have reached maximum wear.

Physical parameter library 160 can also include templates or reference images related to the combination of bucket 120 and GET 125 (e.g., a bucket-tool template). For example, for work machine 100, one of the templates stored in physical parameter library 160 can include an image of bucket 120 with GET 125 as bucket 120 is expected to be positioned within the field of view of camera 128. The bucket-tool templates can when GET 125 are unworn (e.g., unworn or expected edges) or when they have reached maximum wear (e.g., a threshold edge). Physical parameter library 160 can also include other information related to the wear of GET 125 to assist wear analyzer 175 in determining when GET have worn to the point of needing replacement. Wear data related to GET 125 can be in the form of actual measurement (e.g., metric or imperial dimensions) or in the form of pixel values.

Physical parameter library 160 can include multiple physical parameter sets where each physical parameter set corresponds to a work machine, bucket, GET, or a combination of these. During operation, an operator may use operator control panel 130 to select a physical parameter set from physical parameter library 160 matching bucket 120 and GET 125, or work machine 100. For example, if the work machine 100 is a hydraulic mining shovel having a model number "6015B," the operator may use operator control panel 130 to input the model number "6015B," and wear detection computer system 110 may load into memory 150 a physical parameter set corresponding to a model 6015B hydraulic mining shovel from physical parameter library 160. In some examples, a list of templates available in physical parameter library 160 can be shown on display 133 upon a power-up or reset operation of wear detection computer system 110, and an operator may select one of the physical parameter sets from the list for operation depending on the model number of work machine 100, bucket type of bucket 120, or type of GET 125.

In some embodiments, the operator may position bucket 120 and GET 125 within field-of-view 129 of camera 128 at the beginning of a work shift and cause wear detection computer system 110 to capture an image of bucket 120 and GET 125 using an input on operator control panel 130. Wear detection computer system 110 may then perform an image matching process to match the bucket 120 and GET 125 with a physical parameter set and configure itself for the wear detection and image processing processes disclosed herein based on the matching physical parameter set.

Image analyzer 170 can be configured to analyze images captured by camera 128 to identify GET 125 within the images and to measure wear of GET 125 based on processed versions of those images. For example, image analyzer 170 can receive stereoscopic images from camera 128 in the form of left rectified images (captured by the left image sensor of camera 128) and a right rectified image (captured by the right image sensor of camera 128). Image analyzer 170 may perform various computer vision techniques on the left rectified image and the right rectified image to identify or determine regions of interest within them corresponding to GET 125.

In one embodiment, image analyzer 170 may create a dense stereo disparity map based on the left rectified image and the right rectified image. Image analyzer may segment the dense stereo disparity map to identify the regions of interest. In addition, image analyzer 170 may also create a 3D point cloud based on the dense stereo disparity map and may segment the 3D point cloud to identify the regions of interest.

Once image analyzer 170 identifies the regions of interest it may further process them to create a left-edge digital image corresponding to the left rectified image and a right-edge digital image corresponding to the right rectified image. Image analyzer 170 may employ gradient magnitude search-based edge detection, but other edge detection techniques employed within the field of computer vision (e.g., zero-crossing based edge detection techniques) could be employed in other embodiments to create the left-edge digital image and the right-edge digital image.

In addition to computer vision techniques, or as an alternative to using computer vision techniques, image analyzer 170 can also employ deep learning or machine learning techniques to identify regions of interest within left rectified images and right rectified images captured by camera 128. For example, image analyzer 170 may use a deep learning GET detection algorithm that employs a neural network that has been trained to identify regions of interest based on a corpus of images where individual GET, groups of GET, or GET and bucket combinations have been labeled. Image analyzer 170 may also use a deep learning GET-location algorithm that employs a neural network that has been trained to locate GET within an image. The GET-location algorithm have been trained using corpus of images where such individual GET have been have been labeled. Once the GET-location algorithm identifies individual GET within an image, it outputs the corresponding location for the GET. For example, the GET-location algorithm can output a pixel location or a bounding box output related to the location of the GET.

In some examples, image analyzer 170 may refine edge estimates of GET and/or identify individual GET 125 by using an expected location of GET 125 within the captured image. For example, image analyzer 170 may know the expected position of GET 125 relative to bucket 120 based on the physical parameter set stored in physical parameter library 160 corresponding to the type of bucket 120 and GET 125 in use. Using this information, image analyzer 170 can go to the expected location in selected image and capture a pixel region proximate to the teeth. The pixel region can then be used to further identify the tooth based on computer vision techniques such as application of a convolution filter, segmentation analysis, edge detection, or pixel strength/darkness analysis within the pixel region. In some embodiments, image analyzer 170 may use an individual tooth template to apply to the pixel region to further refine the location of the tooth using computer vision techniques. Image analyzer 170 may further refine edges using dynamic programming techniques. Dynamic programming techniques can include smoothing based on the strength of the edge, whether the edge is close to a hole or region of uncertainty in the dense stereo disparity map, or other edge detection optimization techniques. Image analyzer 170 can also use the output of the GET-location algorithm to gain confidence in the determining the location of the GET and to further refine edge estimates based on the output of the GET-location algorithm.

Image analyzer 170 may also create a sparse stereo disparity that is provided to wear analyzer 175 so that wear analyzer 175 can determine wear in GET 125. In some embodiments, image analyzer 170 created the sparse stereo disparity between the left-edge digital image (associated with the left rectified image) and the right-edge digital image (associated with the right rectified image), and this disparity is used by wear analyzer 175. Alternatively, the sparse stereo disparity may be calculated from a first region of interest image (associated with the left rectified image) and a second region of interest image (associated with the right rectified image) and image analyzer 170 may detect an edge from the sparse stereo disparity image.

Wear analyzer 175 can be configured to analyze sparse stereo disparity generated by image analyzer 170 for wear. For example, the physical parameter set associated with bucket 120 and GET 125 can include expected data related to unworn GET 125 or a set of unworn GET 125 that has been calibrated based on the expected image capture of camera 128. The expected data can be in the form of pixels, actual measurement, or an edge image related to unworn GET. Once wear analyzer 175 receives the sparse stereo disparity, it can determine measurement data related to the GET 125 being used by work machine 100. It may then compare the determined measurement data to expected data corresponding to an unworn version of GET 125 to determine wear levels, or loss, for GET 125.

In some embodiments, pixel counts associated with the sparse stereo disparity can be used to measure the wear or loss of GET. Pixel counts can include area (e.g., total pixel for the GET), height of the GET in pixels, width of the GET in pixels, the sum of height and width of the GET, as just some examples. The manner of determining pixel counts can vary depending on the shape and style of the GET. For example, for GET that are much longer than they are wide, height pixel counts may be used, whereas for GET that are much wider than they are long, width pixel counts may be used. Various methods for determining pixel counts may be used without departing from the spirit and scope of the present disclosure.

In some embodiments, wear analyzer 175 can calculate a similarity score between the determined measurement data extracted from the sparse stereo disparity and the expected data corresponding to unworn GET 125. The similarity score can reflect a measure of how well the determined measurement data of GET 125 matches the expected data of the physical parameter set. For example, the similarity score can include use of an intersection of union or Jaccard Index method of detecting similarity. In some embodiments, a dice coefficient or F1 Score method of detecting similarity can be employed to determine the similarity score. The similarity score can also include a value reflecting a percentage of how many pixels of the sparse stereo disparity overlap with the expected edge image. In some embodiments, the similarity score may be scaled or normalized from zero to one hundred.

The similarity score can provide an indication of wear of GET 125. For example, a low score (e.g., a range of 0 to 20) may indicate that one of GET 125 has broken or is missing indicating tooth loss. A high score (e.g., a range 80-100) may indicate that a tooth is in good health and needs no replacing. A score in between the low and high scores can provide a wear level for the tooth, with higher scores indicating a longer lead time for tooth replacement than a lower score.

In some embodiments, wear analyzer 175 can collect measurement data related to GET 125 over time and use the collected measurement data to determine a wear level of GET 125 and a wear trend of GET 125. For example, work machine 100 can be operating in its worksite over several days for a job. As work machine 100 moves material during the job, camera 128 provides stereo images bucket 120 and GET 125 to wear detection computer system 110, and image analyzer 170 creates sparse stereo disparities for GET 125. Wear analyzer 175 can map measurement data (e.g., pixel counts, metric measurements, imperial measurements) associated with the GET 125 at several instances of time over the period of time of the job. As bucket 120 and GET 125 engage with material at the worksite, it is expected that GET 125 will diminish in size due to wear. Accordingly, the measurement data associated with GET 125 will likewise decrease over time, and the pixel counts over time will reflect a wear trend. Wear analyzer 172 can determine a wear level for GET 125 at a particular point in time using the wear trend at the particular point in time. The wear level for GET 125 may indicate that GET 125 need replacement or it may indicate loss of one or more of GET 125. In some embodiments, measurement data associated with GET 125 can be stored in memory 150 and applied to multiple jobs and multiple worksites, and the wear trend can be applicable to the lifetime of GET 125. In such embodiments, pixel counts associated with GET 125 captured by wear analyzer 175 may be reset when bucket 120 or GET 125 are replaced, and wear analyzer 175 can restart collection of pixel counts for GET 125 from a zero-time point.

Since wear analyzer 175 determines a wear trend based on measurement data for GET 125 measured over time, wear analyzer 175 can also form predictions of when GET 125 may need replacement. For example, if wear analyzer 175 determines that measurement data associated with GET 125 show that GET 125 lose 1% of life per ten work hours (because the measurement data decreases by 1% per ten work hours), and GET 125 have been used for eight hundred work hours, wear analyzer 175 may determine that GET 125 need to be replaced within 200 hours.

In some embodiments, wear detection computer system 110 can include alert manager 180. Alert manager 180 can be in communication with wear analyzer 175 and may monitor the wear trend and wear level determined by wear analyzer 175. Alert manager 180 can provide messaging alerts to operator control panel 130 based on information determined by wear analyzer 175. For example, when the wear level reaches a wear threshold value, alert manager 180 may generate an alert that is shown on display 133 of operator control panel 130. The threshold value can correspond to values indicating extreme GET wear or, in some cases, complete GET loss. The alert may provide an indication to the operator of work machine 100 that one or more GET 125 need replacement. The wear threshold value can vary from embodiments and may dependent on the type of GET 125 and the material at the worksite with which GET 125 engage.

Alert manager 180 can also provide an alert that GET 125 may need replacement at some point in the future, for example, that GET 125 may need to be replaced within two weeks. A replacement alert can include information related to wear trend predictions for GET 125. For example, the replacement alert can include a quantification of the wear trend (e.g., GET 125 wear 2% per workday), the amount of time the teeth have been in use, or the expected date or time GET 125 will reach the wear threshold based on usage data.

In some embodiments, alert manager 180 can monitor the wear trend determined by wear analyzer 175 and provide a wear level value to display 133 to inform operator of work machine 100 of the current wear level. For example, if the wear trend indicates that GET 125 are 60% worn down, based on the wear trend, alert manager 180 may provide an indication that GET 125 have 40% of their life left before they need to be replaced. The display 133 can also inform an operator that a tooth has broken, indicating tooth loss (e.g., when one or more of GET 125 have less than 20% life).

Wear detection computer system 110 allows an operator of work machine 100 to be informed when GET 125 need replacement, or has broken, due to extensive wear. The processes employed by wear detection computer system 110—which are described in more detail below—provide for accurate and precise measurement of GET wear at a scale of less than 5 mm allowing an operator to halt operation of work machine 100 in the event of extreme GET wear or loss. The processes and techniques deployed by wear detection computer system 110 can be used with a variety of work machines.

Figure 2:
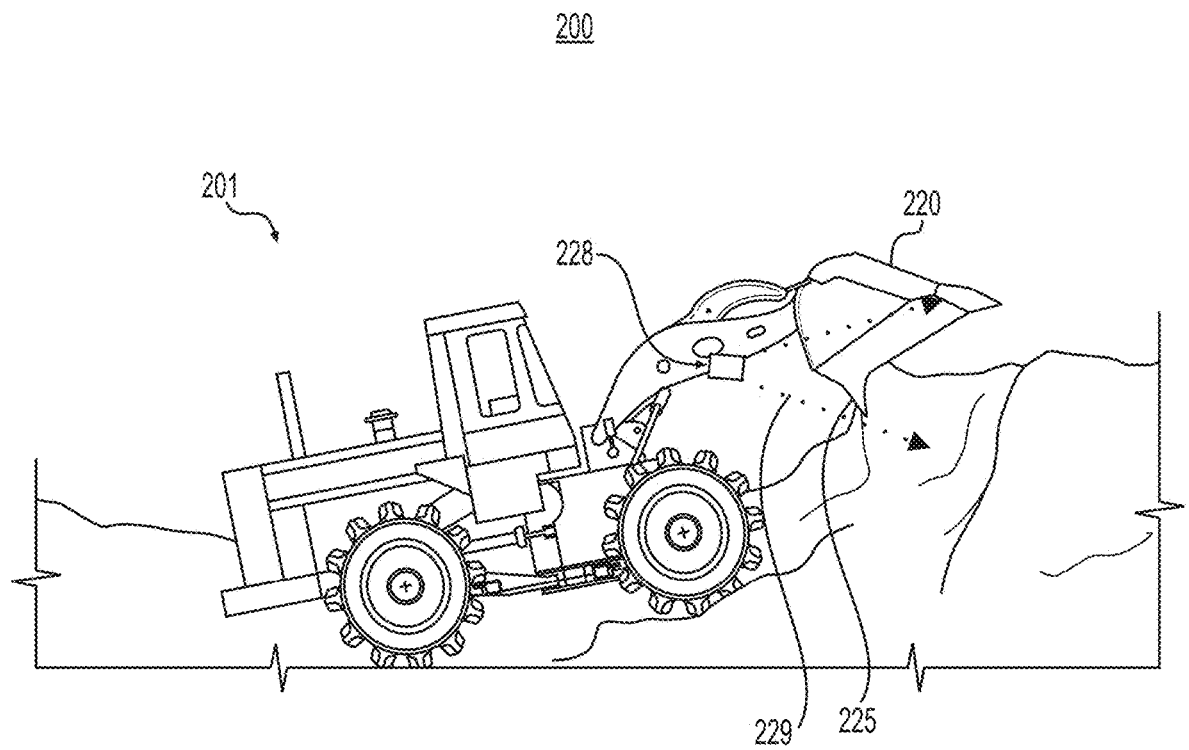
FIG. 2 is a diagram depicting a schematic side view of example environment having an example machine including an example system for detecting wear in GET.

For example, FIG. 2 is a diagram depicting a schematic side view of an example environment 200 in which a wheel loader work machine 201 is operating. Wheel loader work machine 201 can include a bucket 220 and one or more GET 225. As shown in FIG. 2, a camera 228 is positioned so that GET 225 and bucket 220 are within a field of view 229 of camera 228 during a dump end of the dig-dump cycle. As a result, camera 228 can be configured in such embodiments to capture images when bucket 220 is at rest at the dump end of the dig-dump cycle.

Figure 3:
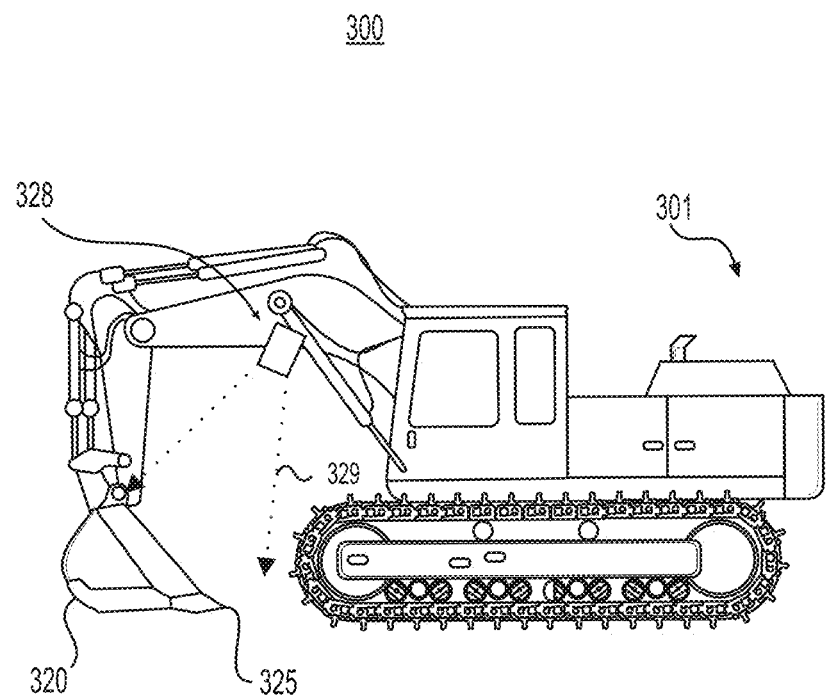
FIG. 3 is a diagram depicting a schematic side view of another example environment having an example machine including an example system for detecting wear in GET.

As another example, FIG. 3 is a diagram depicting a schematic side view of an example environment 300 in which a hydraulic mining shovel work machine 301 is operating. Hydraulic mining shovel work machine 301 can include a bucket 320 and one or more GET 325. In contrast to the position of camera 228 for wheel loader work machine 201, camera 328 is positioned such that GET 325 are within field of view 329 of camera 328 during a dig end of the dig-dump cycle. Camera 328 can be configured in such embodiments to capture images when bucket 320 is at rest at the dig end of the dig-dump cycle.

Figure 4:
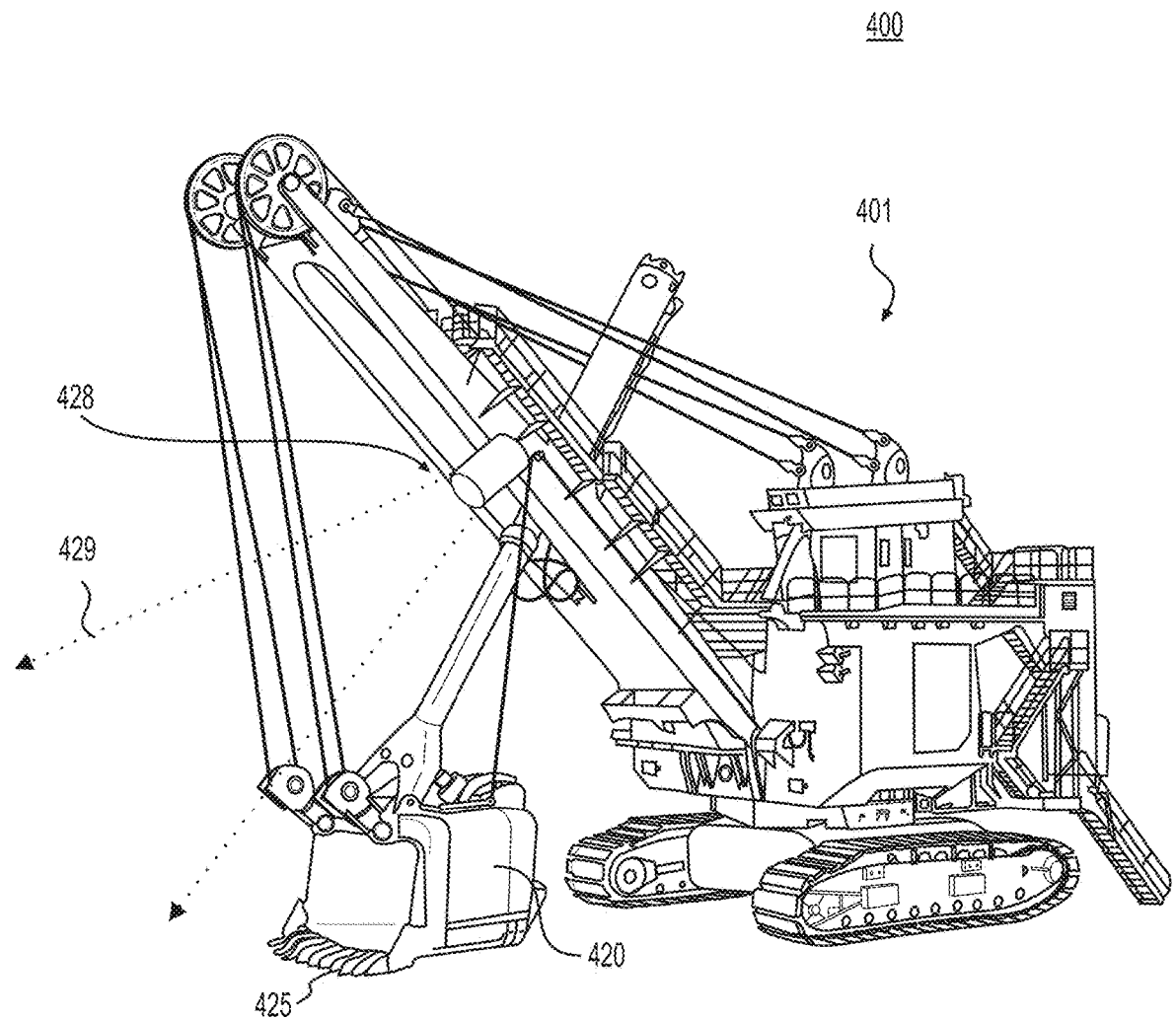
FIG. 4 is a diagram depicting a schematic side view of another example environment having an example machine including an example system for detecting wear in GET

In yet another example, FIG. 4 is a diagram depicting a schematic side view of example an environment 400 in which an electric rope shovel work machine 401 is operating. Electric rope shovel work machine 401 can include a bucket 420, one or more GET 425, and a camera 428. As shown in FIG. 4, GET 425 may be within a field of view 429 of camera 428 at a midpoint in the dig-dump cycle, but when bucket 420 is relatively close to camera 428. In such embodiments, camera 428 can be configured to capture images when bucket 420 enters a range of positions correlating to field of view 429 of camera 428.

Figure 5:
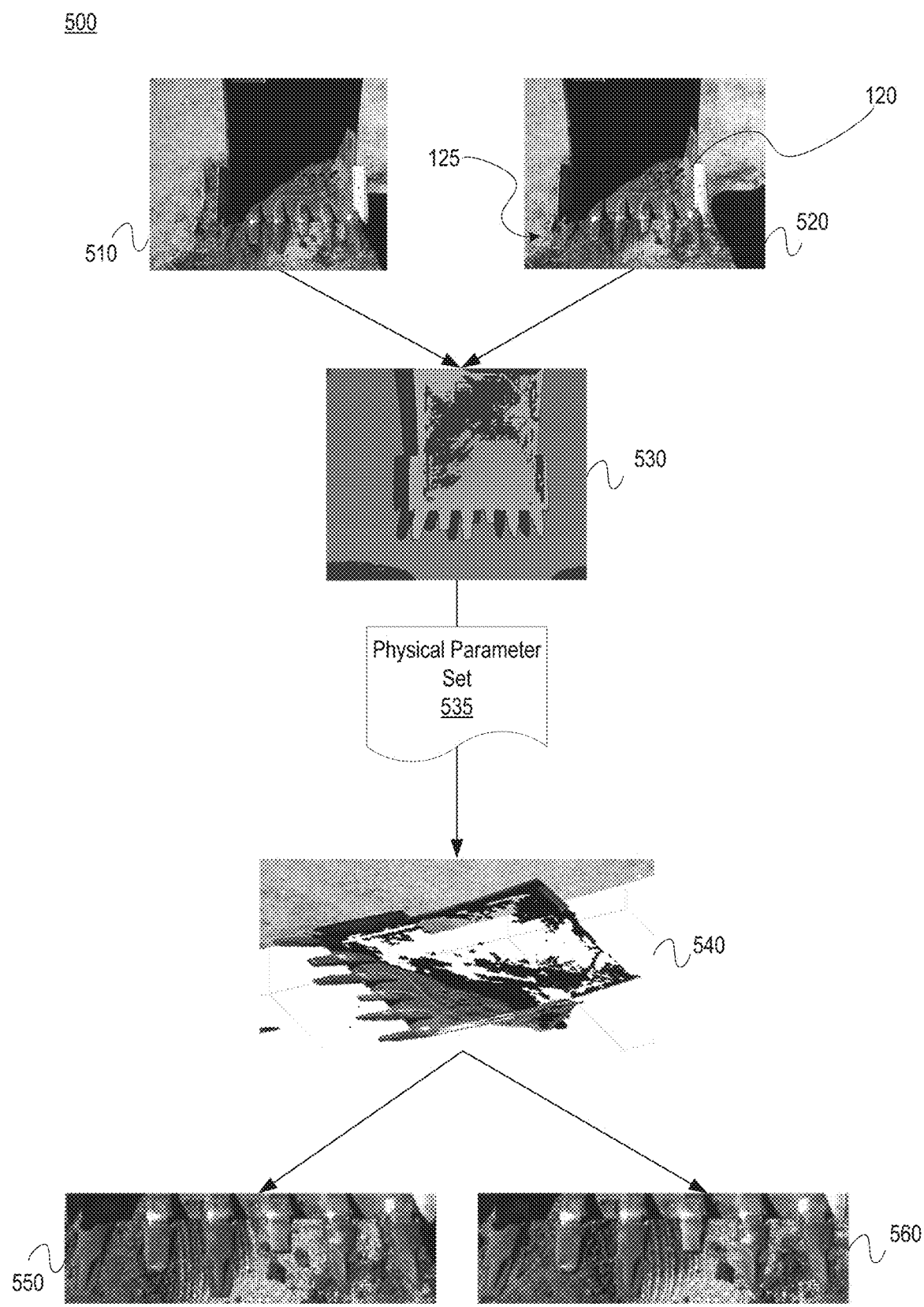
FIG. 5 is an image data flow diagram depicting an example flow of image data for a region of interest detection process using computer vision techniques.

FIG. 5 depicts an image data flow diagram 500 depicting an example flow of image data for a region of interest detection process using computer vision techniques. Image data flow diagram 500 includes images that are received, processed, and generated by image analyzer 170 when detecting regions of interest within images captured by camera 128 related to GET 125. Image data flow diagram 500 includes a left image 510 and a right image 520 captured by camera 128. Left image 510 can be a rectified image captured by the left image sensor of camera 128. Right image 520 can be rectified image captured by the right image sensor of camera 128. Both left image 510 and right image 520 include images of bucket 120 and GET 125.

Image analyzer 170 may process left image 510 and right image 520 to create disparity map 530. Disparity map 530 can be a dense stereo disparity map showing the disparity between each pixel of left image 510 and each pixel of right image 520. Using disparity map 530 and a physical parameter set 535, obtained from physical parameter library 160 and associated with bucket 120, GET 125 and/or work machine 100, image analyzer 170 can build a 3D point cloud 540. 3D point cloud 540 shows disparity between left image 510 and right image 520 in three dimensions. Image analyzer 170 may then perform a routine segmentation analysis on 3D point cloud 540 to identify a first region of interest 550 corresponding to left image 510 and a second region of interest 560 corresponding to right image 520.

Figure 6:
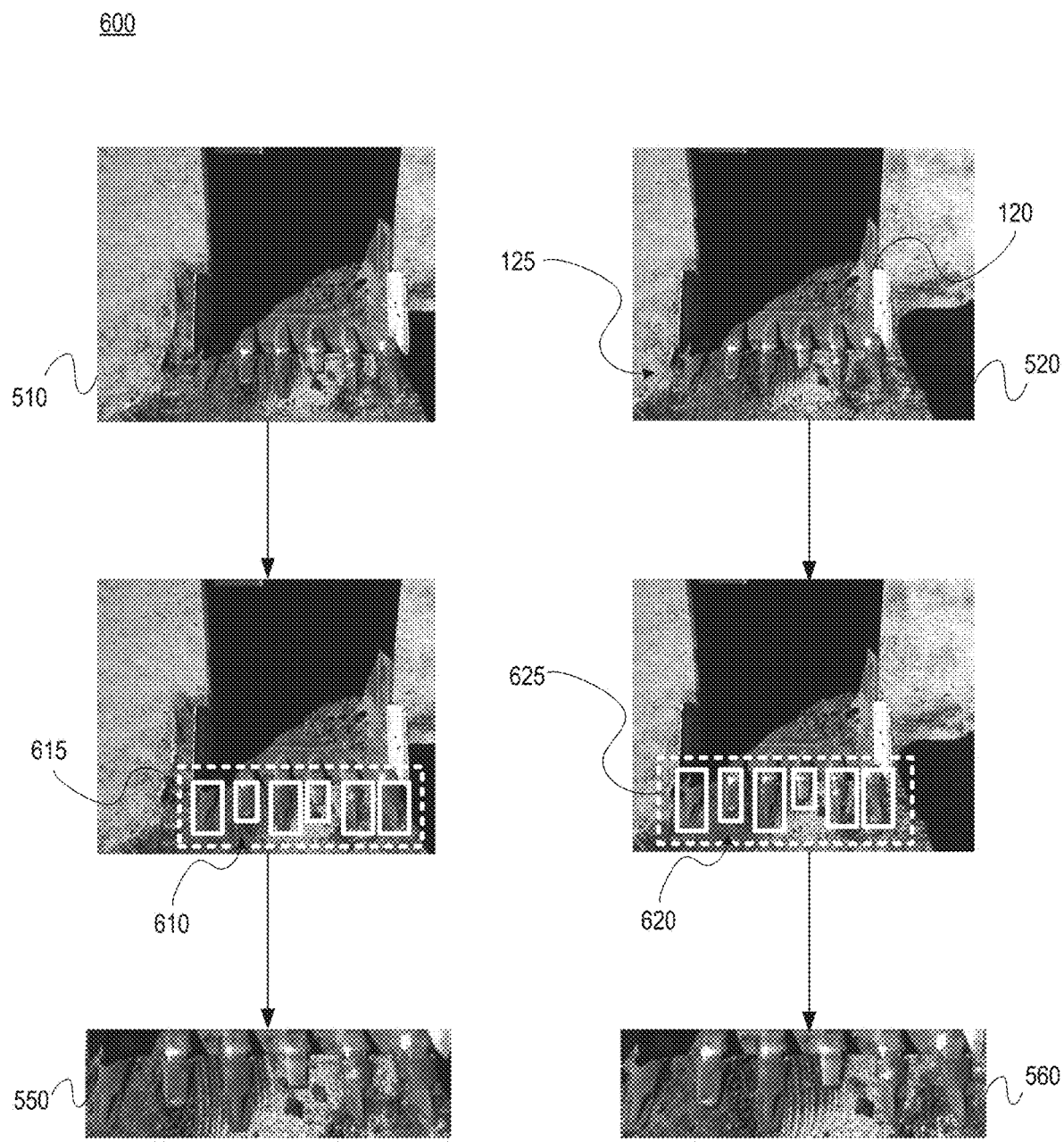
FIG. 6 is an image data flow diagram depicting an example flow of image data for a region of interest detection process using deep learning techniques.

FIG. 6 depicts an image data flow diagram 600 depicting an example flow of image data for a region of interest detection process using deep learning techniques. Similar to image data flow diagram 500 described above, the output of the region of interest detection process will be a first region of interest 550 and a second region of interest 560 corresponding to GET 125. But, unlike image data flow diagram 500, image analyzer 170 utilizes deep learning techniques to detect first region of interest 550 and second region of interest 560.

Image data flow diagram 600 includes left image 510 and right image 520 captured by camera 128. Left image 510 can be a rectified image captured by the left image sensor of camera 128. Right image 520 can be rectified image captured by the right image sensor of camera 128. Both left image 510 and right image 520 include images of bucket 120 and GET 125.

Image analyzer 170 may apply a deep learning GET detection algorithm to left image 510. The deep learning GET detection algorithm may employ a neural network that has been trained with a corpus of image data where GET have been individually identified and labeled and/or groups of GET have been individually identified and labeled. When image analyzer 170 applies the deep learning GET detection algorithm to left image 510, it may identify a plurality of individual GET bounding boxes 610 containing images of individual GET 125. In some embodiments, image analyzer 170 may also identify a GET group bounding box 615 encompassing individual GET bounding boxes 610. Similarly, when image analyzer 170 applies the deep learning GET detection algorithm to right image 520, it may identify a plurality of individual GET bounding boxes 620 containing images of individual GET 125. In some embodiments, image analyzer 170 may also identify a GET group bounding box 625 for right image 520 encompassing individual GET bounding boxes 620. Once image analyzer 170 identifies GET group bounding box 615 it may extract the pixels of it as first region of interest 550. Image analyzer 170 may also extract the pixels of GET group bounding box 625 as second region of interest 560.

Figure 7:
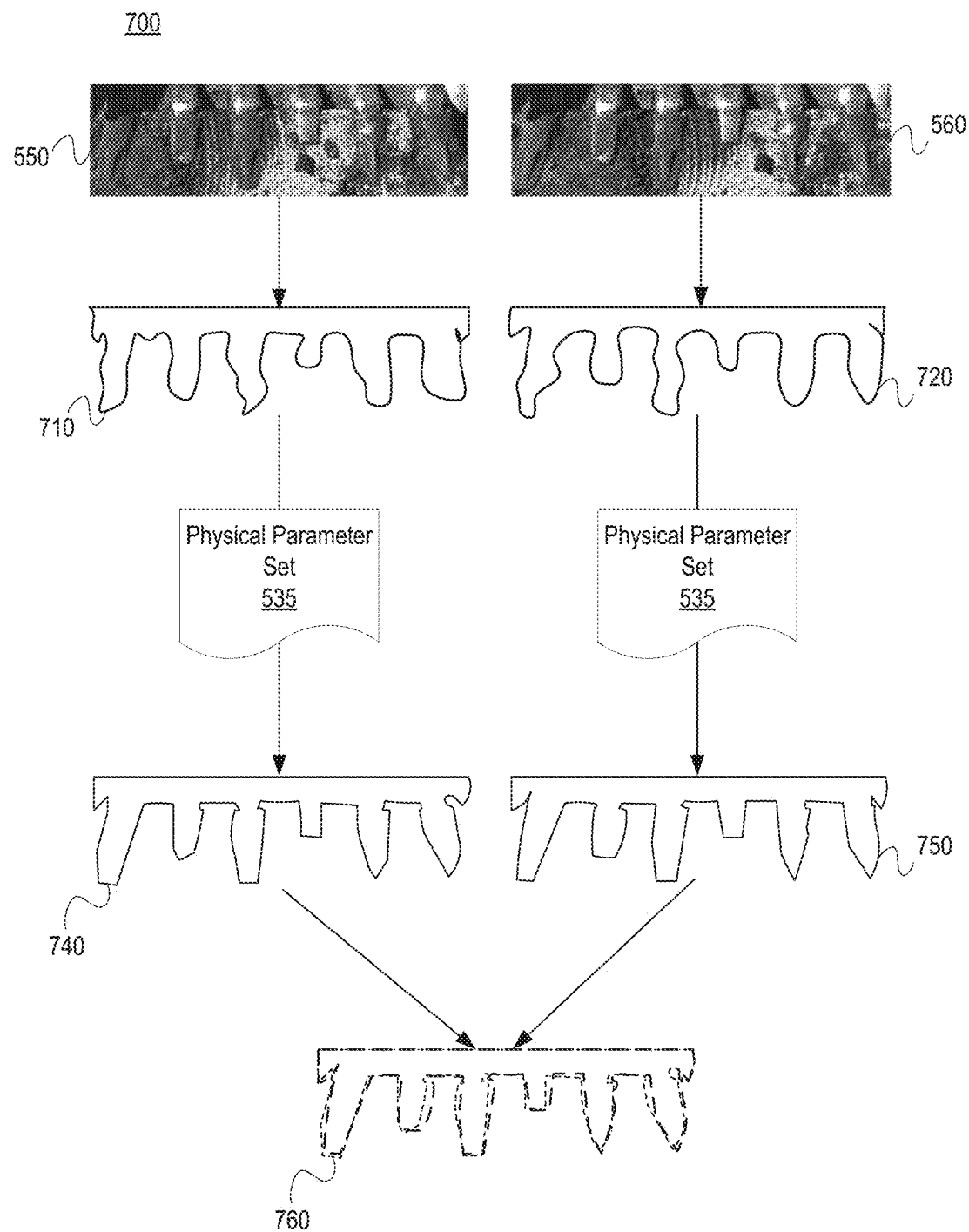
FIG. 7 is an image data flow diagram depicting an example flow of image data for a wear detection process using computer vision techniques.

FIG. 7 depicts an image data flow diagram 700 depicting an example flow of image data for a wear detection process using computer vision techniques. Image data flow diagram 700 includes images that are received, processed, and generated by image analyzer 170 when generating output that will ultimately be provided to wear analyzer 175 to detect wear or loss of GET 125. In some embodiments, the generated output will be in the form of a sparse stereo image.

Image data flow diagram 700 includes first region of interest 550 and second region of interest 560. Both first region of interest 550 and second region of interest 560 may have been generated by image analyzer 170 as described above with respect to either FIG. 5 or FIG. 6, i.e., image analyzer 170 may have generated first region of interest 550 and second region of interest 560 using either computer vision techniques or deep learning techniques. In some embodiments, first region of interest 550 and second region of interest 560 may have been generated using a combination of computer vision techniques and deep learning techniques.

Image data flow diagram 700 also includes unrefined left-edge digital image 710. Image analyzer 170 may generate unrefined left-edge digital image 710 by applying computer vision edge detection techniques to first region of interest 550. The computer vision edge detection techniques can include search-based edge detection techniques such as a gradient magnitude edge detection technique. The computer vision edge detection techniques can also include zero-crossing based techniques. Image analyzer 170 may also perform preprocessing steps before generating unrefined left-edge digital image 710 such as Gaussian smoothing. In some embodiments, image analyzer 170 may employ a Canny edge detector or other well-known edge detectors in the art of computer vision. Similarly, image analyzer 170 may generate unrefined right-edge digital image 720 using similar computer vision edge techniques.

In some embodiments, image analyzer 170 can reduce errors in unrefined left-edge digital image 710 and unrefined right-edge digital image 720 by performing dynamic programming on both. Dynamic programming can include application of physical parameter set 535 to series of optimization routines to reduce errors. The optimization routines can include evaluating the strength of the detected edge, analyzing whether the detected edge is close to or included in a hole or region of uncertainty in disparity map 530, or where the edge may be expected based on physical parameter set 535. Image analyzer 170 may then output refined left-edge digital image 740 and refined right-edge digital image 750 based on the dynamic programming. Image analyzer 170 may then create sparse stereo disparity 760 by calculating the sparse stereo disparity between refined left-edge digital image 740 and refined right-edge digital image 750. Image analyzer 170 may then provide sparse stereo disparity 760 to wear analyzer 175 for detection of wear loss of GET 125 consistent with disclosed embodiments.

Figure 8:
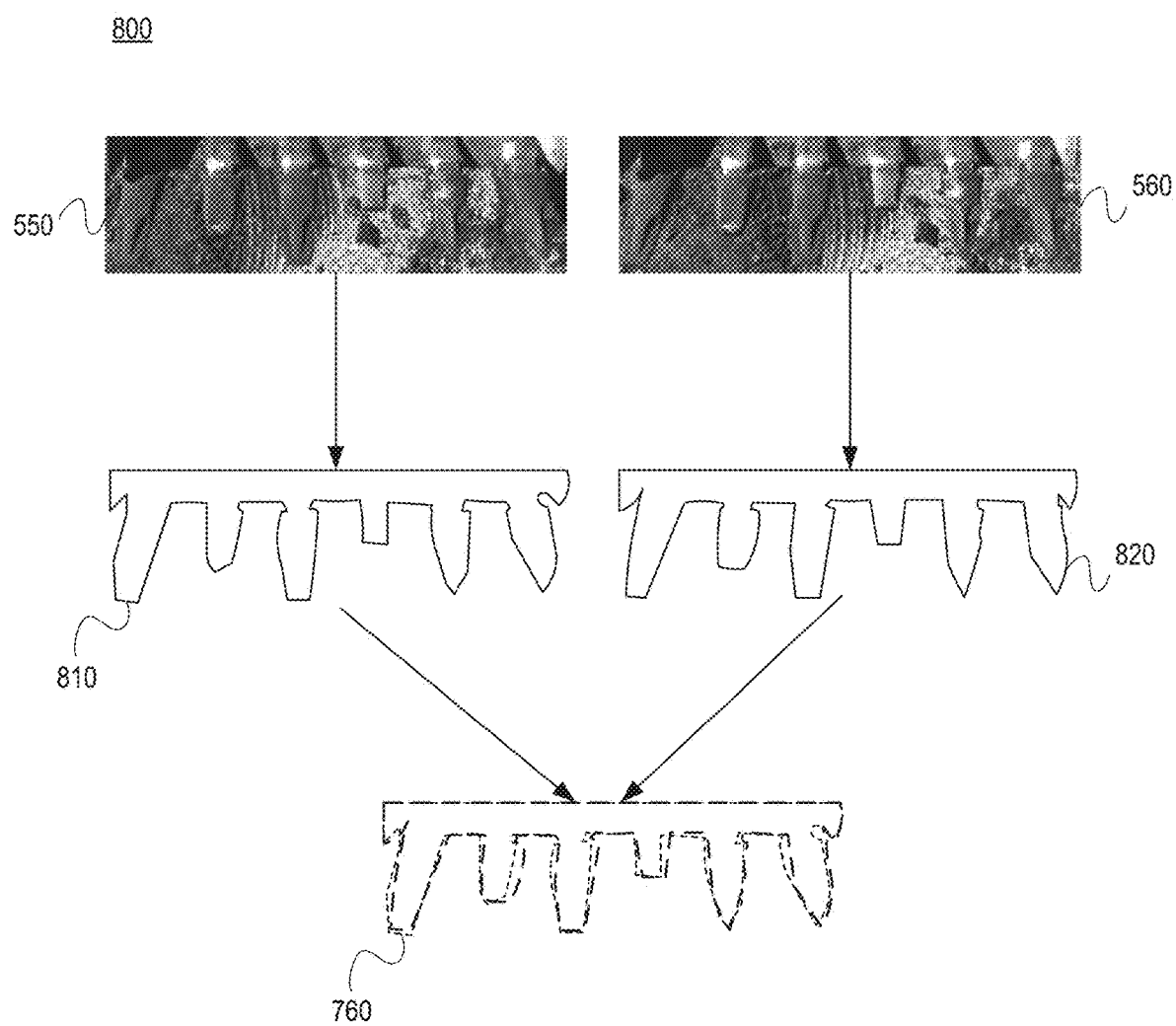
FIG. 8 is an image data flow diagram depicting an example flow of image data for a wear detection process using deep learning techniques.

FIG. 8 depicts an image data flow diagram 800 depicting an example flow of image data for a wear detection process using deep learning techniques. Image data flow diagram 800 includes images that are received, processed, and generated by image analyzer 170 when generating output that will ultimately be provided to wear analyzer 175 to detect wear or loss of GET 125. The generated output can be in the form of a sparse stereo image or it can be in the form of location information corresponding to the GET 125. Image analyzer 170 can use the generated output, in either form, to build confidence in edges determined from the process described in FIG. 8.

Image data flow diagram 800 includes first region of interest 550 and second region of interest 560. Both first region of interest 550 and second region of interest 560 may have been generated by image analyzer 170 as described above with respect to either FIG. 5 or FIG. 6, i.e., image analyzer 170 may have generated first region of interest 550 and second region of interest either using computer vision techniques or deep learning techniques. In some embodiments, first region of interest 550 and second region of interest 560 may have been generated using a combination of computer vision techniques and deep learning techniques.

Image data flow diagram 800 also includes left-edge digital image 810 and right-edge digital image 820. Image analyzer 170 may generate left-edge digital image 810 and right-edge digital image 820 using deep learning techniques. For example, image analyzer 170 may generate left-edge digital image 810 and right-edge digital image 820 using a deep learning GET-location algorithm. The deep learning GET-location algorithm may employ a neural network that has been trained using a corpus of images identifying where edges of groups of GET 125 have been labeled and identified for training purposes. In some embodiments, image analyzer 170 determines locations of an edge corresponding to GET 125. In addition, or alternatively, image analyzer 170 determines the location of individual GET 125.

In some embodiments, after image analyzer 170 generates the left-edge digital image 810 and right-edge digital image 820, it may use the location of either, or both, edges with respect to the region of interest to build confidence in the edges created using computer vision techniques, such as those described above with respect to image data flow diagram. In some examples, image analyzer 170 may further refine edge-images it creates using computer vision techniques with the output of deep learning GET-location algorithm, or in instances where the output of GET-location algorithm differs significantly from edge-images generated by tradition computer vision techniques, may disregard the images for wear detection processing entirely.

In some embodiments, image analyzer 170 creates a sparse stereo disparity 760 by calculating the sparse stereo disparity between left-edge digital image 810 and right-edge digital image 820. Image analyzer 170 may then provide sparse stereo disparity 760 to wear analyzer 175 for detection of wear loss of GET 125 consistent with disclosed embodiments.

Figure 9:
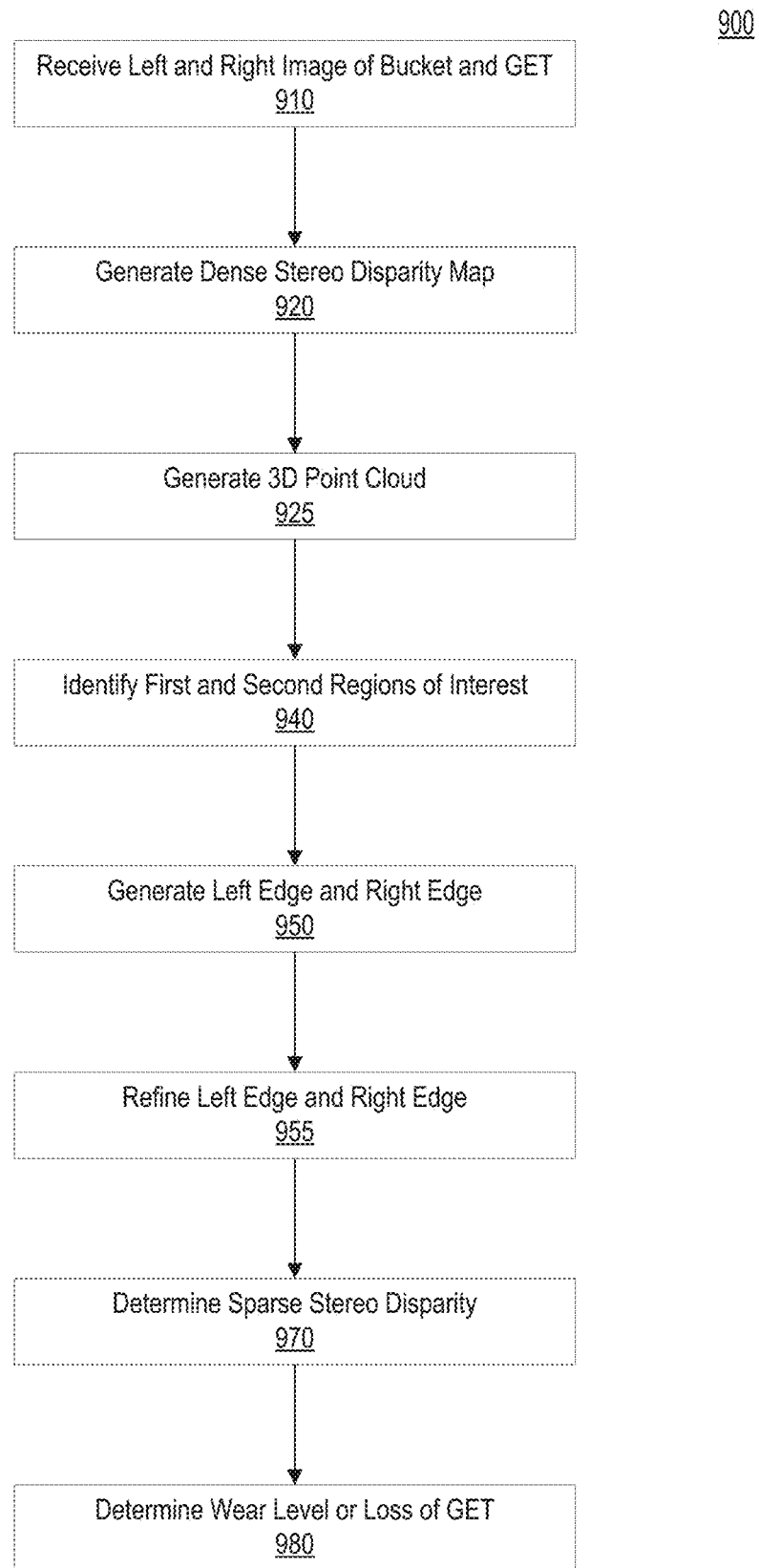
FIG. 9 is an example process for detecting wear in an example environment using computer vision techniques.

FIG. 9 shows a flowchart representing an example computer vision wear detection process 900 that employs computer vision techniques to detect wear of GET 125. In some embodiments, process 900 can be performed by image analyzer 170 and wear analyzer 175. Process 900 generally follows the image data flow of FIGS. 5 and 7 and should be interpreted consistent with the description of these figures. Although the following discussion describes aspects of process 900 being performed by image analyzer 170 or wear analyzer 175, other components of wear detection computer system 110 may perform one or more blocks of process 900 without departing from the spirit and scope of the present disclosure.

Process 900 begins at block 910 where image analyzer 170 receives a left image and a right image of bucket 120 and GET 125. The left image may be captured by the left image sensor of camera 128 and the right image may be captured by the right image sensor of camera 128. Both the left image and right image may be rectified images. At block 920, the image analyzer may generate a dense stereo disparity map based on the disparity between the pixels of the left image and the right image. Using the generated dense stereo disparity map and the physical parameter set associated with bucket 120 and GET 125, image analyzer 170 may generate a 3D point cloud representing a 3D image of bucket 120 and GET 125 at block 925. From the 3D point cloud, image analyzer 170 may identify a first region of interest associated with the left image and second region of interest associated with the right image at block 940. As noted above, this can be accomplished by performing a segmentation analysis on the 3D point cloud using information from the physical parameters set associated with bucket 120 and GET 125. Both the first region of interest and the second region of interest include images of GET 125.

At block 950, image analyzer 170 may generate a left-edge digital image associated with the first region of interest and right-edge digital image associated with the second region of interest. The left-edge digital image and the right-edge digital image may be generated using computer vision edge detection techniques consistent with disclosed embodiments. At block 955, image analyzer 170 may refine the left-edge digital image and the right-edge digital image using dynamic programming techniques and the physical parameter set associated with bucket 120 and GET 125. Image analyzer 170 may then determine a sparse stereo disparity based on the left-edge digital image of the right-edge digital image at block 970. At block 980, wear analyzer 175 may determine a wear level or loss of one or more of GET 125 using techniques described above with respect to FIG. 1.

Figure 10:
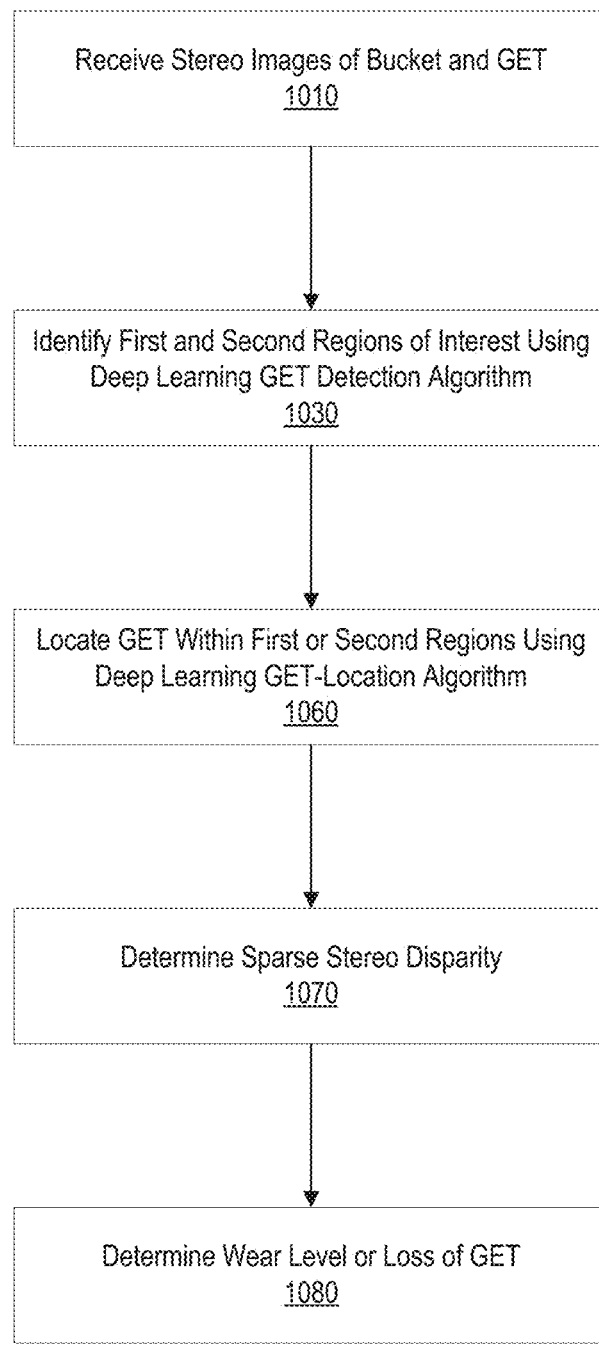
FIG. 10 is an example process for detecting wear in an example environment using deep learning techniques.

FIG. 10 shows a flowchart representing an example deep learning wear detection process 1000 that employs deep learning or machine learning techniques to detect wear of GET 125. In some embodiments, process 1000 can be performed by image analyzer 170 and wear analyzer 175. Process 1000 generally follows the processes described above with respect to FIGS. 6 and 8 and should be interpreted consistent with the description of these figures. Although the following discussion describes aspects of process 1000 being performed by image analyzer 170 or wear analyzer 175, other components of wear detection computer system 110 may perform one or more blocks of process 1000 without departing from the spirit and scope of the present disclosure.

At block 1010, image analyzer 170 receives stereo images of bucket 120 and GET 125. The stereo images can include a left image captured by the left image sensor of camera 128 and a right image captured by the right image sensor of camera 128. The stereo images can also include a color image captured by the color image sensor of camera 128. Image analyzer 170 may use the left image, the right image, and the color image at block 1030 with a deep learning GET detection algorithm to identify a first region of interest corresponding to the left image and a second region of interest corresponding to the right image. Use of the color image may improve performance of the deep learning GET detection algorithm in certain embodiments.

At block 1060 image analyzer 170 locates GET within the first region of interest or the second region of interest using a deep learning GET-location algorithm. The deep learning GET-location algorithm can include a neural network that has been trained using a corpus of images where GET have been labeled within the image. The labels can include labels of individual GET or groups of GET. In some embodiments, the deep learning GET-algorithm analyzes the first region of interest (corresponding to the left image) or the second region of interest (corresponding to the right image) by applying the digitized regions of interest as input to the neural network, and the output of the neural network may be the pixel locations of GET within the regions of interest, or bounding boxes related to the locations of GET within the regions of interest. In some embodiments, deep learning GET-location algorithm may detect location of GET in both the first region of interest and the second region of interest, whereas in others it may use one of the first region of interest or the second region of interest. Whether the deep learning GET-location algorithm detects location of GET within the first region of interest, the second region of interest, or both, may vary upon implementation, and may vary depending on the type of GET, the type of bucket, or type of work machine.

In some embodiments, at block 1060, the deep learning GET-location algorithm outputs edge images corresponding to the GET. The edge images (e.g., left-edge digital image 810, right-edge digital image 820) may correspond to the outline of the GET within either the first region of interest or the second region of interest. In such embodiments, deep learning GET-location algorithm may include a neural network that has been trained using a corpus of images including a GET or GET attached to a bucket where the edges of the GET have been labeled. The deep learning GET-algorithm analyzes the first region of interest (corresponding to the left image) or the second region of interest (corresponding to the right image) by applying the digitized regions of interest as input to the neural network, and the output of the neural network would include a left-edge digital image corresponding to the first region of interest and a right-edge digital image corresponding to the second region of interest.

At block 1070, image analyzer 170 can determine a sparse stereo disparity. In embodiments where the deep learning GET-location algorithm outputs a left-edge digital image and a right-edge digital image at block 1060, image analyzer 170 may determine a sparse stereo disparity between the left-edge digital image in the right-edge digital image. In embodiments where the deep learning GET-location algorithm outputs locations of GET within the first region of interest, the second region of interest, or both, image analyzer 170 can determine the sparse stereo disparity using computer vision techniques (e.g., as described above with respect to block 970 of process 900) and may use the output of the deep learning GET-location algorithm to build confidence or verify the accuracy of the left-edge digital image and the right-edge digital image generated by the computer vision techniques.

At block 1080, wear analyzer 175 may determine a wear level or loss of one or more of GET 125 using techniques described above with respect to FIG. 1.

Figure 11:
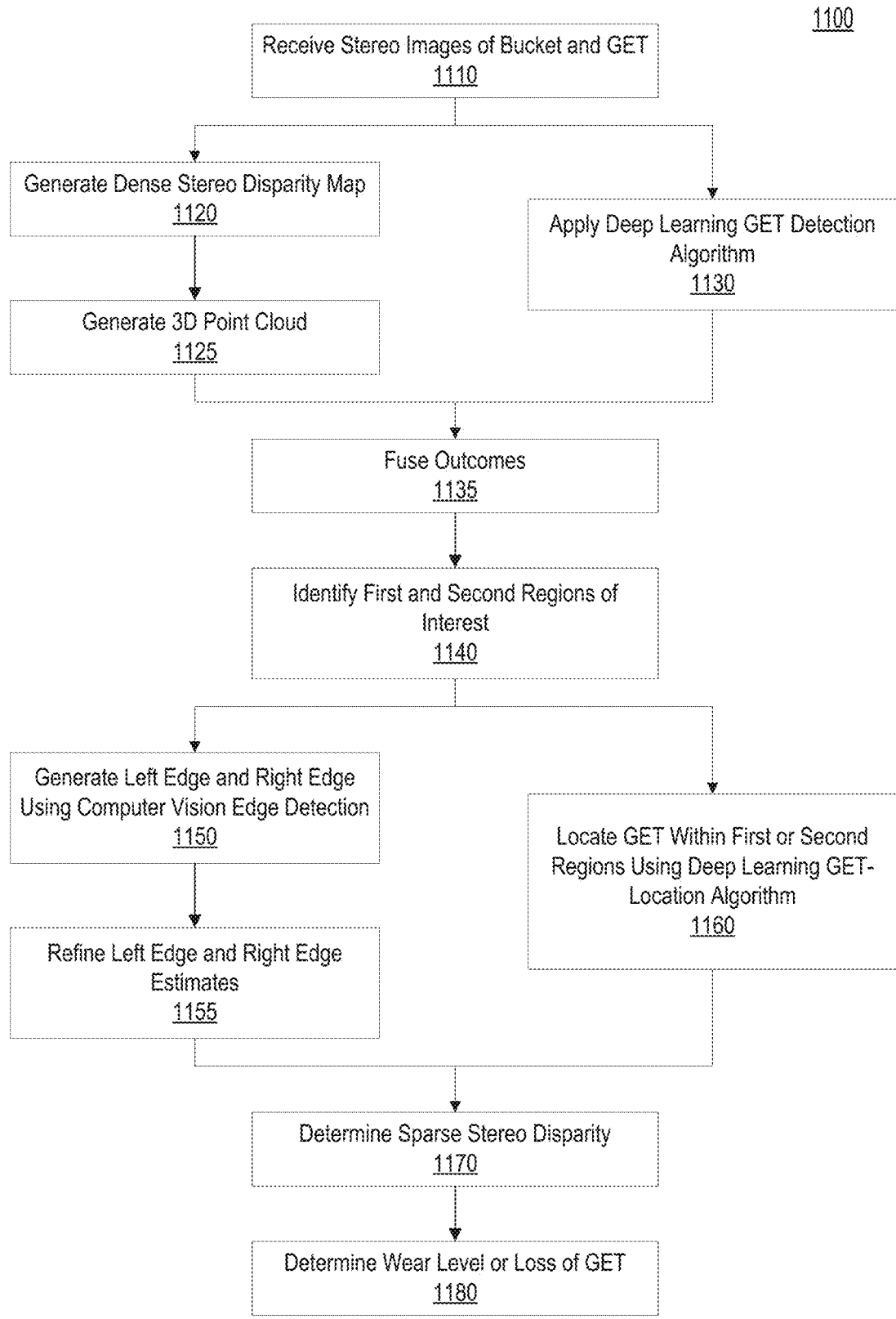
FIG. 11 is an example process for detecting wear in an example environment using a hybrid of computer vision and deep learning techniques

FIG. 11 shows a flowchart representing an example hybrid wear detection process 1100 that employs a combination of deep learning or machine learning techniques to detect wear of GET 125. In some embodiments, process 1100 can be performed by image analyzer 170 and wear analyzer 175. Although the following discussion describes aspects of process 1100 being performed by image analyzer 170 and wear analyzer 175, other components of wear detection computer system 110 may perform one or more blocks of process 1100 without departing from the spirit and scope of the present disclosure.

According to some embodiments, certain blocks of process 1100 are performed in parallel and combined to improve performance of identification of regions of interest and determination of sparse stereo disparities. Many of the blocks shown in process 1100 are similar to blocks of process 900 and 1000 described above, and blocks performing similar operations have the same last two numerals. For example, block 1110 of process 1100 is similar in function to block 910 of process 900 and block 1010 of process 1000.

At block 1110, image analyzer 170 receives stereo images of bucket 120 and GET 125. Image analyzer 170 then performs one set of operations (blocks 1120, 1125) using computer vision techniques in parallel with the second set of operations (block 1130) using deep learning techniques to identify a first region of interest associated with a left image of the stereo images and a second region of interest associated with the right image of the stereo images. Accordingly, at block 1120 image analyzer 170 generates a dense stereo disparity map based on the stereo images similar to block 920 of process 900. At block 1125, image analyzer 170 generates a 3D point cloud similar to block 925 of process 900. At block 1130, image analyzer 170 applies a deep learning GET detection algorithm based on the stereo images similar to block 1030 of process 1000.

Process 1100 then continues to block 1135 where image analyzer 170 fuses the outcomes of blocks 1120 and 1125 with the outcome of block 1130. Image analyzer 170 may use dynamic programming techniques to generate an optimized first region of interest corresponding to the left image and an optimized second region of interest corresponding to the right image. For example, image analyzer 170 may utilize a physical parameter set describing the spatial relationship between bucket 120 and GET 125 in combination with the 3D point cloud and information outputted by the deep learning GET detection algorithm to determine a more accurate extraction of the regions of interest. Using the fused outcomes, image analyzer 170 may identify the first region of interest and the second region interest at block 1140.

Process 1100 then performs the sparse stereo disparity generation using both computer vision techniques and deep learning techniques. Accordingly, at block 1150 image analyzer 170 generates a left-edge digital image and a right-edge digital image using computer vision edge detection techniques similar to that described above with respect to block 950 of process 900. At block 1155, the left-edge digital image and the right-edge digital image are refined as described above with respect to block 955 of process 900. At block 1160, image analyzer 170 locates GET with the first region of interest or the second region of interest using a deep learning GET-location algorithm in a fashion similar to that described above with respect to block 1060 of process 1000.

At block 1170, image analyzer 170 uses the refined left-edge digital image and refined right-edge digital image determined at block 1155 and the output of block 1160 to determine a sparse stereo disparity 1170 corresponding to the shape and size of GET 125. In some embodiments, image analyzer 170 may use the physical parameter set associated with bucket 120 and GET 125 when performing operations at block 1170 to fuse the information between the computer vision techniques (blocks 1150 and 1155) and deep learning techniques (block 1160). For example, image analyzer 170 may utilize the expected size and shape of GET, the relative positioning of GET 125 to the side of bucket 120 engaging GET 125, the smoothness or continuity of the refined left-edge digital image and refined right-edge digital image (from block 1155), the location of GET within the first region of interest or second region of interest (from block 1160) and/or the smoothness or continuity of the left-edge digital image and right-edge digital image (from block 1160) to perform optimization analysis and determine the sparse stereo disparity. At block 1180, wear analyzer 175 may determine a wear level or loss of one or more of GET 125 using techniques described above with respect to FIG. 1.

In some embodiments, process 1100 may flow to include various combinations of computer vision techniques or deep learning techniques. For example, process 1100 may follow a process flow of block 1110, 1120, 1125, 1140, 1160, 1170, 1180 (i.e., not including blocks 1130, 1135, 1150, and 1155). As another example, process 1100 may follow a process flow of block 1110, 1130, 1140, 1150, 1155, 1170, 1180 (i.e., not including blocks 1120, 1125, 1135, and 1160). In addition, process 1100 may use computer vision techniques to identify regions of interest (blocks 1120 and 1125) and deep learning techniques to identify the left-edge digital image and the right-edge digital image (block 1160). Conversely, process 1100 may use deep learning techniques to identify regions of interest (block 1130) and computer vision techniques (blocks 1150 and 1155) to identify a left-edge digital image and a right-edge digital image.

Throughout the above description, certain components of wear detection computer system 110 were described to perform certain operations. But, in some embodiments of wear detection computer system 110, other components may perform these operations other than what is described above. In addition, wear detection computer system 110 may include additional or fewer components than what is presented above in example embodiments. Those of skill in the art will appreciate that wear detection computer system 110 need not be limited to the specific embodiments disclosed above.

INDUSTRIAL APPLICABILITY

The systems and methods described herein can be used in association with operation of work machines at a worksite that are excavating, moving, shaping, contouring, and/or removing material such as soil, rock, minerals, or the like. These work machines can be equipped with a bucket used to scoop, dig, or dump the material while at the worksite. The bucket can be equipped with a series of ground engaging tools (GET) to assist with the loosening of the material during operation. The work machines can also include a system having a processor and memory configured to perform methods of wear detection according to the examples described herein. The systems and methods can detect wear or loss of work machine components such as GET so operators of such work machines can take corrective action before a failure damaging downstream processing equipment can occur.

In some examples, the systems and methods can capture, from a stereo camera associated with the work machine, stereo images of the work machine component for wear detection processing. The stereo images can be captured in the form of a left-side image and a right-side image.

In some examples, the system and methods may process the left-side image and the right-side image using computer vision techniques and by creating a dense stereo disparity map. The dense stereo disparity map can be segmented to identify regions of interest within the images related to the GET. The system and methods may further process the regions of interest using computer vision techniques—such as gradient magnitude edge detection techniques—to identify a left-edge digital image and a right-edge digital image outlining the shape of the GET. The systems and methods can then determine a sparse stereo disparity using the left-edge digital image and right-edge digital image from which the GET captured in the left-side image and right-side image can be measured. GET wear, or loss, can be determined based on these measurements.

Use of sparse stereo disparity to determine the size of GET can increase the accuracy of GET wear measurements because it can measure wear at an accuracy of less than 5 mm. Thus, systems and methods using the above described techniques has advantages over systems that do not use sparse stereo disparity, which can only detect wear at granularity on the order of centimeters or tens of centimeters. More accurate wear detection can decrease the likelihood of catastrophic GET loss or wear which can cause damage to downstream processing machines.

In some examples, the systems and methods may process the left-side image and the right-side image using deep learning techniques. The systems and methods may employ a deep learning GET detection algorithm using a neural network trained to identify regions of interest within the left-side image and right-side image corresponding to GET. Once the regions of interest have been detected, a sparse stereo disparity between a left-edge digital image corresponding to the left-side image and a right-edge digital image corresponding to the right-side image can be determined. As noted above, use of the sparse stereo disparity increases accuracy of wear measurements.

In other examples, the systems and methods may process the left-side image and the right-side image using both of computer vision and deep learning techniques, and in some instances, applying these techniques in parallel. In such examples, the systems and methods can increase GET measurement accuracy by fusing the output of each technique to find a best case measurement of GET. By using a fused output, GET measurement accuracy can be increased over traditional systems that do not employ sparse stereo disparities or do not use both computer vision and machine learning techniques.

While aspects of the present disclosure have been particularly shown and described with reference to the examples above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof.

What is claimed is:

1. A computer-implemented method, comprising:
 receiving, from a stereoscopic camera associated with a work machine, a left image, a right image, and a color image of a bucket of the work machine, the bucket having at least one ground engaging tool (GET), wherein the left image and the right image are digital and monochrome;
 applying a deep learning GET detection algorithm to the left image, the right image, and the color image for:
  identifying a first region of interest from the left image, the first region of interest corresponding to the at least one GET, and
  identifying a second region of interest from the right image, the second region of interest corresponding to the at least one GET;
 generating a left-edge digital image digital image corresponding to the first region of interest;
 generating a right-edge digital image corresponding to the second region of interest;
 determining a sparse stereo disparity between the left-edge digital image and the right-edge digital image;
 determining a wear level or loss for the at least one GET based on the sparse stereo disparity; and
 applying a deep learning GET-location algorithm to at least one of the first region of interest or the second region of interest to build confidence in the sparse stereo disparity.

2. The method of claim 1 wherein:
 identifying the first region of interest from the left image and identifying the second region of interest from the right image includes applying a deep learning GET detection algorithm to the left image and the right image.

3. The method of claim 1 wherein identifying the first region of interest from the left image and the second region of interest from the right image includes generating a dense stereo disparity map for the left image and the right image.

4. The method of claim 3 wherein identifying the first region of interest from the left image and the second region of interest from the right image further includes generating a 3D point cloud based at least in part on the dense stereo disparity map.

5. The method of claim 1 wherein identifying the first region of interest from the left image and the second region of interest from the right image includes:
  applying a deep learning GET detection algorithm to the left image and the right image; and
  generating a dense stereo disparity map for the left image and the right image.

6. The method of claim 1 wherein generating the left-edge digital image corresponding to the first region of interest and generating the right-edge digital image corresponding to the second region of interest includes application of gradient magnitude edge digital image detection techniques.

7. A system, comprising:
  a stereoscopic camera;
  one or more processors; and
  non-transitory computer readable media storing executable instructions that when executed by the one or more processors cause the one or more processors to perform operations comprising:
    receiving, from the stereoscopic camera, a left image, a right image, and a color image of a bucket of a work machine, the bucket having at least one ground engaging tool (GET), wherein the left image and the right image are digital and monochrome;
    applying a deep learning GET detection algorithm to the left image, the right image, and the color image for:
      identifying a first region of interest from the left image, the first region of interest corresponding to the at least one GET, and
      identifying a second region of interest from the right image, the second region of interest corresponding to the at least one GET;
    generating a left-edge digital image digital image corresponding to the first region of interest;
    generating a right-edge digital image corresponding to the second region of interest;
    determining a sparse stereo disparity between the left-edge digital image digital image and the right-edge digital image;
    determining a wear level or loss for the at least one GET based on the sparse stereo disparity; and
    applying a deep learning GET-location algorithm to at least one of the first region of interest or the second region of interest to determine confidence in the sparse stereo disparity.

8. The system of claim 7 wherein identifying the first region of interest from the left image and the second region of interest from the right image includes generating a dense stereo disparity map for the left image and the right image.

9. The system of claim 8 wherein identifying the first region of interest from the left image and the second region of interest from the right image further includes generating a 3D point cloud based at least in part on the dense stereo disparity map.

10. The system of claim 7 wherein generating the left-edge digital image digital image corresponding to the first region of interest and generating the right-edge digital image corresponding to the second region of interest includes application of gradient magnitude edge detection techniques.

11. The system of claim 7 wherein the stereoscopic camera includes at least one of the one or more processors.

12. A work machine comprising:
  a stereoscopic camera comprising:
    a left monochrome image sensor,
    a right monochrome image sensor, and
    a color image sensor;
  a bucket comprising at least one ground engaging tool (GET);
  one or more processors; and
  non-transitory computer readable media storing executable instructions that when executed by the one or more processors cause the one or more processors to perform operations comprising:
    receiving, from the stereoscopic camera:
      a left image of the bucket captured by the left monochrome image sensor,
      a right image of the bucket captured by the left monochrome image sensor, and
      a color image of the bucket captured by the color image sensor;
    identifying a first region of interest from the left image and a second region of interest from the right image by:
      applying a deep learning GET detection algorithm to the left image, the right image, and the color image, and
      generating a dense stereo disparity map for the left image and the right image;
    generating a left-edge digital image digital image corresponding to the first region of interest and a right-edge digital image corresponding to the second region of interest by using gradient magnitude edge detection techniques;
    determining a sparse stereo disparity between the left-edge digital image digital image and the right-edge digital image;
    determining a wear level or loss for the at least one GET based on the sparse stereo disparity; and
    applying a deep learning GET-location algorithm to at least one of the first region of interest or the second region of interest to determine confidence in the sparse stereo disparity.

13. The work machine of claim 12 wherein the stereoscopic camera includes at least one of the one or more processors.

* * * * *